May 10, 1966     F. L. HEISLEY     3,250,008
PORTABLE ENGRAVING MACHINE
Filed May 14, 1964
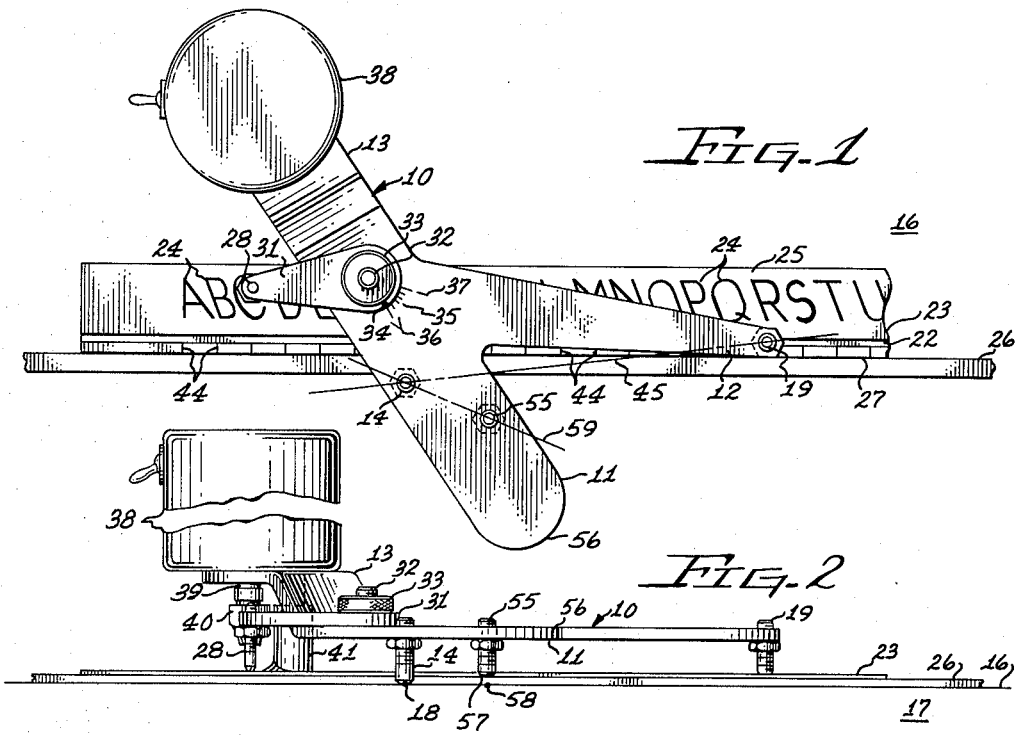
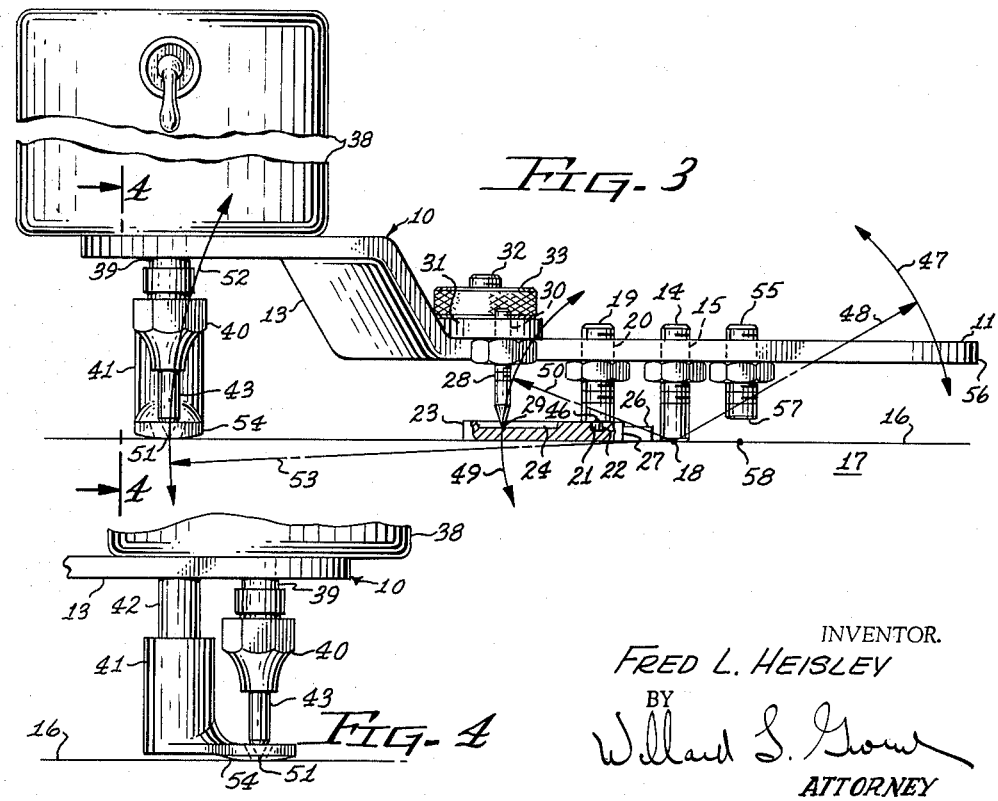
INVENTOR.
FRED L. HEISLEY
BY
Willard L. Grow
ATTORNEY

United States Patent Office 3,250,008
Patented May 10, 1966

3,250,008
PORTABLE ENGRAVING MACHINE
Fred L. Heisley, 6515 N. 12th St., Phoenix, Ariz.
Filed May 14, 1964, Ser. No. 367,307
3 Claims. (Cl. 33—23)

This invention pertains to engraving machines and is particularly directed to an improved manually operated portable engraving machine.

One of the objects of this invention is to provide an improved portable engraving machine for cutting or scribing letters, symbols and characters in wood, metal or plastic.

Another object of this invention is to provide a manually operated portable engraving machine particularly adapted to be operated on a table, drawing board or on a panel and which is especially adapted to engrave large sheets of wood, metal or plastic as well as small parts.

Further features and advantages of this invention will appear from a detailed description of the drawings in which:

FIG. 1 is a plan view of an engraving machine incorporating the features of this invention.

FIG. 2 is a front elevation of the engraving machine shown in FIG. 1.

FIG. 3 is a left hand elevation of the engraving machine shown in FIGS. 1 and 2.

FIG. 4 is an enlarged fragmentary view on the line 4—4 of FIG. 3.

As an example of one embodiment of this invention, there is shown an engraving machine comprising a frame 10 having a counter balance arm 11, a tracking stylus arm 12, and the motor support arm 13. Fixed in the frame 10 at the inner end of the counter balance arm 11 is the rocker point pin 14 by a suitable threaded mounting 15, the outer end of which engages the surface 16 of the workpiece or work table 17 at the rocker point 18.

At the outer end of the tracking stylus arm 12, which extends angularly outwardly from the frame relative to the counter balance arm, is mounted the tracking stylus 19 suitably fixed by the threaded connection 20. The outer lower end of the tracking stylus has a reduced end or tip 21 which engages in and is adapted to slide longitudinally of the template groove 22 formed in the template 23.

The template 23 of plastic or metal or other suitable material is formed with suitable letters, symbols or characters 24 cut into the surface 25 to serve as the guide for the engraving machine. A suitable straight edge piece 26 is secured to the work or table surface 16 by a suitable conventional clamp or adhesive means against which the edge 27 of the template 23 is placed so that the template can be moved parallel to the piece to be engraved.

A tracing stylus 28 has a tip 29 operatively engaging in the guide letters 24 of the template and is supported by a suitable threaded connection at 30 at the outer end of the tracing stylus arm 31 which is pivoted around a stud 32 fixed in the frame 10 and adapted to be clamped against pivotal movement to the frame by a clamp knob 33. An indicating mark 34 on the arm 31 moves in indicative relationship with suitable indicia 35 formed on the frame 10 so as to vary and select the degree of slant to be obtained for the engraved characters between vertical at 36 of slanted to the right up to 15 degrees at 37.

Suitably fixed to the outer end of the motor support arm 13 is the cutter drive motor 38 having a downwardly extending motor shaft 39 upon the lower end of which is mounted a suitable collet chuck 40 for gripping and holding a suitable cutter, inked pen or scribe 43 in operative position. A depth regulator 41 is adjustably mounted on the support stud 42 so that the depth of cut can be preset as required.

To operate the machine, a piece of plastic, wood or metal is placed on the work table surface 16 and held down with double-faced adhesive tape or other means, or, as shown in FIG. 3, the entire machine may be placed directly on the workpiece surface 16, such as a panel, door, sheet or the like of material to be engraved.

A template 23 is selected to produce the desired size and style of engraved copy and placed under the tracing stylus 28.

The cutter 43 is lowered to the desired position of the first character on the work then the machine is raised by depressing the counter balance arm 11 and the template 23 is slid so that the desired character 24 is under the tracing stylus 28. The template 23 should be placed against the straight edge 26 so that it can be moved parallel to the piece to be engraved.

The cutter depth is set by appropiate vertical adjustment of the depth regulator 41. For additional adjustment the cutter 43 may be loosened in the collet chuck and slid out or in by hand.

The motor 38 is turned on while holding the cutter above the work with the counter balance arm 11 and, with the tracing stylus 28 in the groove in the proper character 24, the cutter 43 is lowered until the depth regulator 41 rests on the work. The stylus 28 is then slowly guided around the character. Two complete tracings are generally sufficient. The cutter 43 is lifted from the work and the stylus 28 from the template 23.

To cut the next character the template 23 is moved so that the desired character 24 is one space to the right of the first character, the index marks 44 on the template are used for this purpose. The machine frame is then moved to the right and the tracing stylus 28 dropped into the character 24. The cutter 43 is then lowered and the next character cut on the work.

It is important to note that the frame 10 is rocked about an axis 45 defined by the rocker point 18 of the rocker point pin contact with the surface 16 and the point of engagement 46 of the tracking stylus at the template groove 22 by pressure of the palm or heel of the right hand on the outer end of the counter balance arm 11 to swing it in an arc 47 about the radius 48. The tracing stylus tip 29 is thus swung in the arcuate path 49 on radius 50 while the tip 51 of the cutter, scribe or inked pen travels in the arcuate path 52 on radius 53. Thus, because of the shorter radius 50 for the tracing stylus tip as compared with the radius 53 for the cutter tip 51, initial small downward deflection of the outer end of the counter balance are by the palm of the hand selectively lifts the cutter tip from the work surface while still maintaining the tracing stylus tip within the template characters 24. Further depression downward of the outer end of the counter balance arm 11 then completely lifts and frees the tracing stylus tip from the template characters 24 for sliding the template along to a new character to thus provide a counter balance technique with motor 38 on the opposite side of the rocking axis 45 from the counter balance arm by which the engraving machine may be controlled by one hand in all its functions.

The depth regulator 41 with its shoe 54 riding on the work surface being engraved together with the rocker point 18 and tracking stylus point 46 determine vertical control of the frame 10 which horizontal control is obtained from the template characters 24.

It is to be further noted that the cutter 43 may be mounted directly on the motor shaft 39 or in place of the motor a scribe or inked pen may be utilized and appropriately mounted on the outer end of the support arm 13.

It is also contemplated to use a guide track, such as the template groove 22 as an integral part of either the template 23, as shown in FIGS. 1 and 3, or as part of the template guide or holder 26 or a template holder, not shown, adapted to secure the template 23 to the workpiece surface 16. It is also within the preview of this invention to provide the template groove or tracking groove 22 in the work table surface 16 if desired, together with a guide slot in place of the straight edge piece 26 for sliding guiding of the template 23.

It is further to be noted that a second rocker point pin 55 is fixed to the counter balance arm 11 intermediate the rocking axis 45 and the outer end 56 of the counter balance arm 11 so that when the arm 11 is pressed all the way down the end 57 of the second rocker point pin 55, which is shorter than the rocker point pin 14, then engages the surface 16 at the point 58 setting up a second axis of rocking 59 for the frame 10 so that as the counter balance arm 11 outer end 56 engages the surface 16, the tracking stylus tip 21 is raised out of the template groove 22 to facilitate changing templates and otherwise manipulating the machine.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A portable engraving machine comprising in combination:
(A) a frame comprising,
(B) a counterbalance arm,
(C) a laterally extending tracking stylus arm on said frame,
(D) a motor support arm on said frame longitudinally aligned with said counterbalance arm,
(E) a rocker point pin on said frame intermediate the outer ends of said counterbalance arm and said motor support arm having a rocker point on its lower end adapted to engage the work surface to be operated upon,
(F) a template adapted to be supported for longitudinal sliding movement on said work surface including a longitudinally extending template groove associated therewith,
(G) a tracking stylus on the outer end of said tracking stylus arm having a tip at its lower end operatively engaging in said template groove,
(H) said frame further comprising a tracing stylus arm extending laterally of said counterbalance and motor support arms in the opposite direction from said tracking stylus arm,
(I) a tracing stylus on the outer end of said tracing stylus arm having a tip at its lower outer end adapted to operatively engage in the tracing characters formed in the surface of said template,
(J) a cutter drive motor mounted on the outer end of said motor support arm having a downwardly extending motor shaft,
(K) a cutter mounted on said motor shaft,
(L) and a depth regulator mounted on said motor support arm having a shoe portion associated with said cutter and engaging the work surface being engraved.

2. A portable engraving machine comprising in combination:
(A) a frame comprising,
(B) a counterbalance arm,
(C) a laterally extending tracking stylus arm on said frame,
(D) a motor support arm on said frame longitudinally aligned with said counterbalance arm,
(E) a rocker point pin on said frame intermediate the outer ends of said counterbalance arm and said motor support arm having a rocker point on its lower end adapted to engage the work surface to be operated upon,
(F) a template adapted to be supported for longitudinal sliding movement on said work surface including a longitudinally extending template groove associated therewith,
(G) a tracking stylus on the outer end of said tracking stylus arm having a tip at its lower end operatively engaging in said template groove,
(H) said frame further comprising a tracing stylus arm extending laterally of said counterbalance and motor support arms in the opposite direction from said tracking stylus arm,
(I) a tracing stylus on the outer end of said tracing stylus arm having a tip at its lower outer end adapted to operatively engage in the tracing characters formed in the surface of said template,
(J) a cutter drive motor mounted on the outer end of said motor support arm having a downwardly extending motor shaft,
(K) a cutter mounted on said motor shaft,
(L) a depth regulator mounted on said motor support arm having a shoe portion associated with said cutter and engaging the work surface being engraved,
(M) a second rocker point pin on said counterbalance arm located intermediate said first mentioned rocker point pin and the outer end of said counterbalance adapted to engage said work surface being operated upon when the outer end of said counterbalance arm is moved toward fully depressed position so as to raise said tracking stylus from said template groove.

3. A portable engraving machine comprising in combination:
(A) a frame comprising,
(B) a counterbalance arm,
(C) a laterally extending tracking stylus arm on said frame,
(D) a motor support arm on said frame longitudinally aligned with said counterbalance arm,
(E) a rocker point pin fixed on said frame having a rocker point on its lower end adapted to engage the work surface being operated upon so that depressing the outer end of said counterbalance arm causes said frame to rock about an axis passing through the point of rocker point pin contact and the point of contact of the tracking stylus in said template groove,
(F) a template adapted to be supported for longitudinal sliding movement on said work surface including a longitudinally extending template groove associated therewith,
(G) a tracking stylus on the outer end of said tracking stylus arm having a tip at its lower end operatively engaging in said template groove,
(H) said frame further comprising a tracing stylus arm extending laterally of said counterbalance and motor support arms in the opposite direction from said tracking stylus arm, (I) a tracing stylus on the outer end of said tracing stylus arm having a tip at its lower outer end adapted to operatively engage in the tracing characters formed in the surface of said template, (J) a cutter drive motor mounted on the outer end of said motor support arm having a downwardly extending motor shaft, (K) a cutter mounted on said motor shaft, (L) and a depth regulator mounted on said motor support arm having a shoe portion associated with said cutter and engaging the work surface being engraved.

References Cited by the Examiner
UNITED STATES PATENTS 2,686,971  8/1954  Valois _____ 33—23
2,958,131  11/1960 Keene _____ 33—23

LEONARD FORMAN, *Primary Examiner.*

ISAAC LISANN, *Examiner.*

H. N. HAROIAN, *Assistant Examiner.*